April 12, 1955  H. L. MANDEVILLE  2,706,042
DOUGH EJECTING DEVICE FOR DOUGH ROUNDERS
Filed Oct. 6, 1952  2 Sheets-Sheet 1
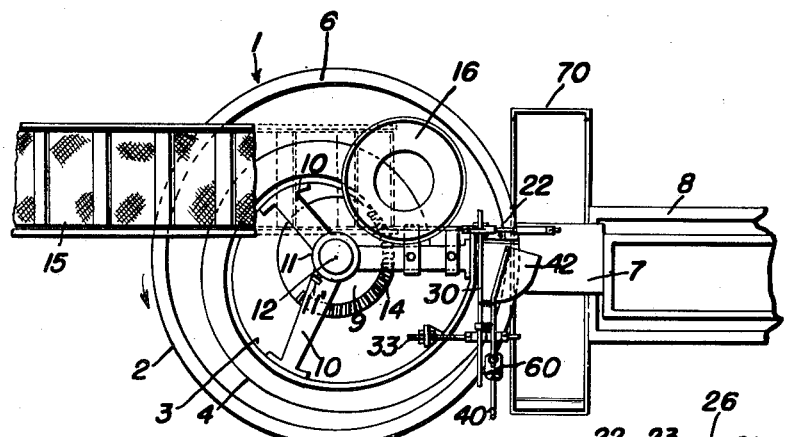
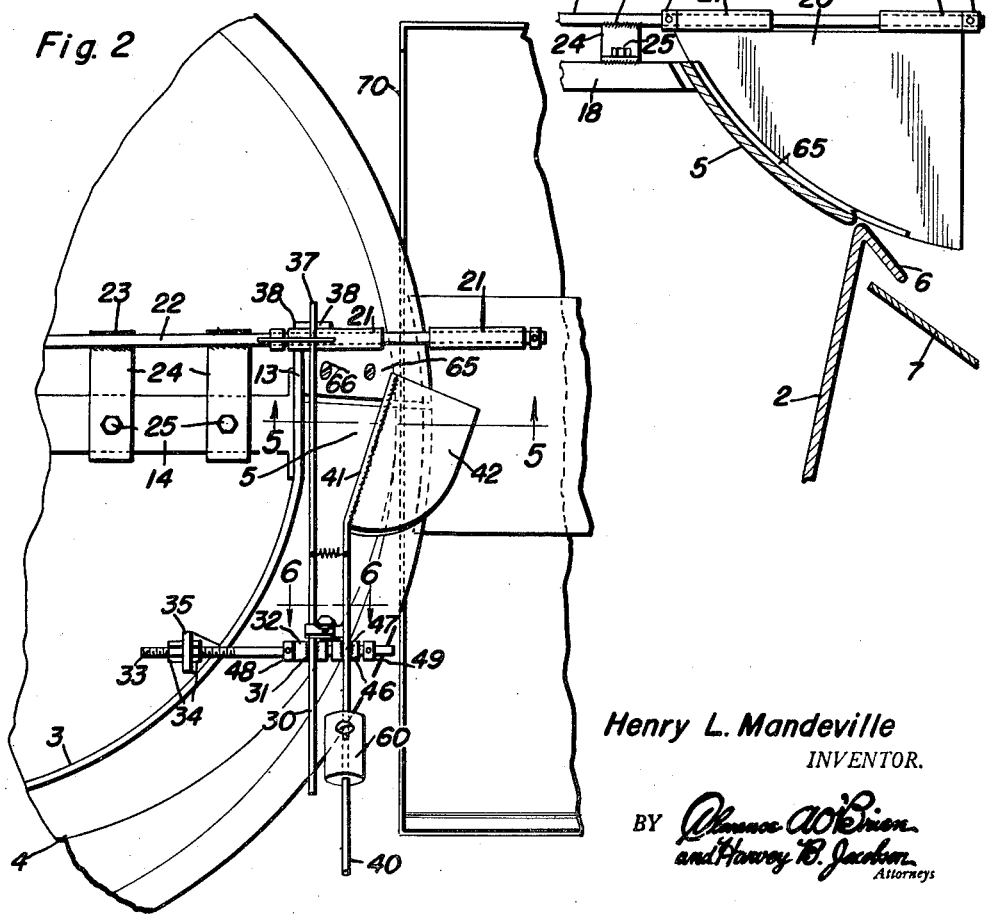
Henry L. Mandeville
INVENTOR.

April 12, 1955   H. L. MANDEVILLE   2,706,042
DOUGH EJECTING DEVICE FOR DOUGH ROUNDERS
Filed Oct. 6, 1952   2 Sheets-Sheet 2

Henry L. Mandeville
INVENTOR.

United States Patent Office 2,706,042
Patented Apr. 12, 1955

2,706,042

DOUGH EJECTING DEVICE FOR DOUGH ROUNDERS

Henry L. Mandeville, Montpelier, Vt., assignor of one-half to J. Raymond Bumgardner, Montpelier, Vt.

Application October 6, 1952, Serial No. 313,285

5 Claims. (Cl. 209—88)

My invention relates to improvements in dough ejecting devices for dough rounders of the centrifugal type.

By way of premise, in processing bread dough and the like for baking, in commercial bakeries, pre-sized pieces of dough are rolled in a centrifugal rounder into lumps of the proper size for baking and are discharged from the rounder into other bakery equipment usually a conveyor leading to a proofer. In the conventional rounder, the dough is rolled by a rotating bowl up a stationary spiral mold board, the lumps being discharged over the rim of the bowl at the upper end of the mold board, and frequently two lumps adhere together in their progress up the mold board and form what are known in the trade as doubles. These doubles, or oversized lumps, must be eliminated so that the same will not pass on into the proofer or other equipment, as the case may be.

Having the foregoing in mind, the primary object of my invention is to provide a quick acting ejecting device attachable to the rounder for causing ejection of the doubles from the rounder and which requires no alteration in the construction of the rounder.

Another object is to provide a device for the above purpose which is adapted to be unlatched for operation by impact of the doubles against the same to permit the doubles to be ejected longitudinally of the mold board out of the path of ejection of the lumps of proper size and to one side of and remote from the conveyor.

Still another object is to provide a device for the foregoing purposes which will not interfere with the ejection or discharge of lumps of the proper size out of the rounder to the conveyor.

Still another object is to provide a device for the foregoing purposes which is easy to maintain clean and sanitary, not liable to get out of order, and is inexpensive to manufacture and install.

Other and subordinate objects, within the purview of my invention, together with the precise nature of my improvements will be readily understood when the succeeding description and claims are read with reference to the drawings accompanying and forming part of this specification.

In said drawings:

Figure 1 is a fragmentary view in plan of my invention, in the preferred embodiment thereof, attached to the conventional rounder connected by a conveyor to a proofer;

Figure 2 is an enlarged fragmentary plan view of the same with parts of the rounder eliminated to more clearly illustrate the invention;

Figure 5 is a further enlarged fragmentary view in vertical transverse section taken on the line 5—5 of Figure 2;

Figure 3:
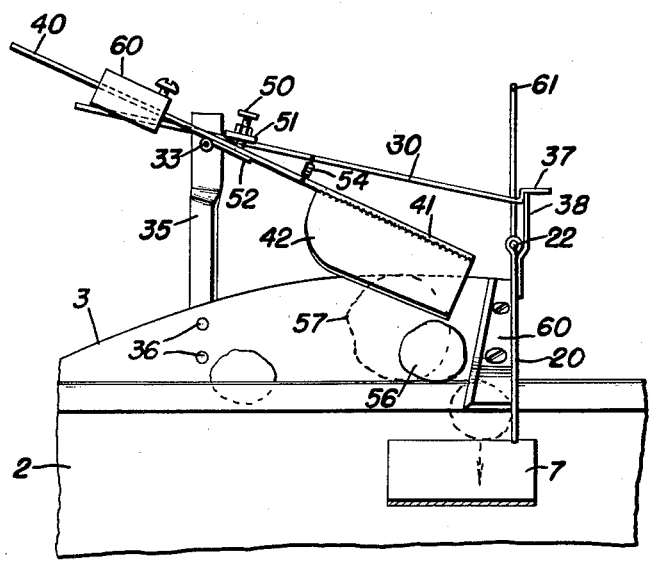
Figure 3 is a fragmentary view in front elevation of the same.
Figure 6:
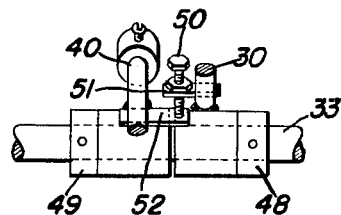
Figure 6 is a fragmentary enlarged view in transverse section taken on the line 6—6 of Figure 2.
Figure 4:
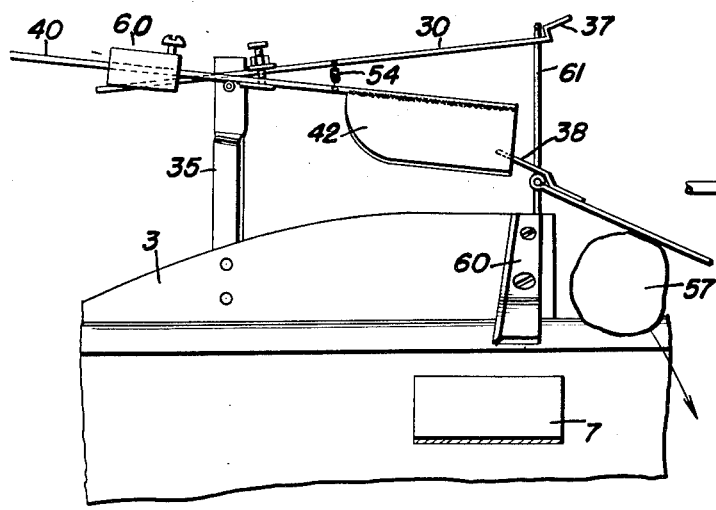
Figure 4 is a fragmentary view in front elevation of the same illustrating the deflecting gate unlocked and operated by a double into open position.
Figure 7:
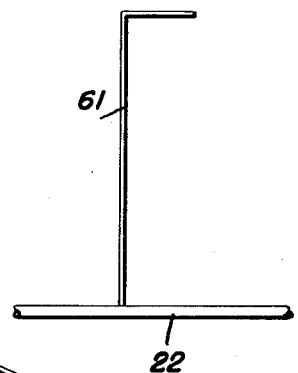
Figure 7 is a fragmentary view in elevation of the stop arm and the rod on which said arm is fixed.

Referring to the drawings by numerals, the rounder 1 to which my invention is attached, and which is shown generally, as sufficient for the present purposes, comprises an upwardly flaring bowl 2 rotated by suitable drive, not shown, in the direction indicated by the arrow in Figure 1, about a vertical fixed spiral mold board 3 forming with said bowl an upwardly spiraling trough 4 in which the pieces of dough, cut to size, are rolled upwardly and worked into rounded form to a highest terminal discharge portion 5 of the mold board 3, and trough 4, at one side of the rounder to be discharged from said portion 5 outwardly laterally, substantially radially, over the rim 6 of the bowl and in this instance, onto a conveyor 7 leading to a proofer 8.

The mold board 3 starts from a bottom section 9 and is carried by arms 10 radiating from a hub 11 fixed by set bolts, as at 11', on an axial fixed shaft 12 about which the bowl 2 rotates. The upper end 13 of the mold board 3 terminates opposite the discharge portion 5 of the mold board in an upright portion and is supported by another arm 14 at said portion radiating from the hub 11 and which is in the rear and opposite the portion 5 and expressly mentioned for a reason presently clear. At the discharge portion 5, the trough 4, or mold board 3, is tilted downwardly and outwardly, as shown in Figure 5, to the rim 6 so that the lumps traveling under momentum onto said portion will tend to discharge with a rolling action off said portion laterally of the mold board and over the rim 6 of said bowl.

An overhead conveyor 15 leading to a drop 16 over the bowl 2 provides for feeding pre-sized pieces of dough into the bottom of the rounder.

For a more detailed disclosure of such a rounder as that briefly described in the foregoing, attention is directed to U. S. Patent No. 2,165,495 to Fred Marasso.

The dough ejecting means of my invention comprises a sheet metal dough deflecting gate 20 extending across the mold board 3, and trough 4, at the end of the discharge portion 5. The deflecting gate 20 is pivotally mounted to gravitate into normal, pendant, closed position by means of hinge barrels 21 on the upper edge thereof rotatable on a horizontal rod 22 traversing said portion 5 and welded, as at 23, to bracket arms 24 bolted, as at 25, to the before mentioned arm 14, the arrangement being such that said deflecting gate hangs in closed pendant position in the path of movement of lumps of dough over and beyond the discharge portion 5 and is swingable under impact of lumps of dough against the same forwardly and upwardly of said path into open position to permit doubles to pass under said gate and under the rod 22.

As best shown in Figure 3, the deflecting gate 20 extends longitudinally over the conveyor 7 at one side of the longitudinal center of said conveyor. The purpose of this will presently appear. A pair of set collars 26, 27 on said rod 22 confine the hinge barrels 21 therebetween.

Latch means is provided for releasably retaining the deflecting gate in closed position. This means comprises a latch rod 30 above the mold board 3 and trough 4 transverse to the deflecting gate 20 and which is pivotally mounted for vertical swinging into and out of latching position by welding the same, as at 31, to a sleeve 32 rotatable on a horizontal rod 33 extending transversely of and above the mold board 3 and trough 4 with one end fixed, by nuts 34, in an upstanding bracket arm 35, bolted, as at 36, to the mold board 3.

The latch rod 30 extends forwardly, as regards the direction of movement of the lumps of dough, over the rod 22 and deflecting gate 20 and is provided with a terminal right angled catch 37. The latch rod 30 is overbalanced to engage said catch 37 by gravity, with a latch bar 38 upstanding from and suitably fixed to the deflecting gate 20, and whereby said gate is latched in closed position normally.

Means operative by the double is provided for swinging the latch rod 30 into unlatching gate releasing position comprising the following. A latch rod releasing arm 40 extends alongside the latch rod 30 with the front end 41 overlying the discharge portion 5 and provided at said front end with a lateral, outwardly and downwardly inclined size determining plate 42 at the outer side of the discharge portion 5 overlying said portion and adapted to determine the size of the lumps traveling over said portion 5.

The latch rod releasing arm 40 is pivoted intermediate its ends on the rod 33 for vertical swinging of its front end upwardly with said plate 42 by means of a sleeve 46 on which said arm 40 is welded as at 47, said sleeve being rotatable on said rod 33. Set collars 48, 49 on rod 33 confine the sleeves 32, 46 therebetween. The latch bar releasing arm 40 is overbalanced at its front end 41 to swing downwardly at said end and lower the size determining plate 42 over the discharge portion 5 at the outer side thereof.

In the latching position of the latch rod 30, a set screw 50 in a lateral lug 51 on said rod 30 overlies a lateral lug 52 on the latch rod releasing arm 40 and provides means whereby said rod 30 in its latching position swings the front end 41 of said arm 40 and the size determining plate 42, downwardly, said means also providing an operating connection between said arm 40 and rod 30 whereby upward swinging of the front end 41 of said arm 40 and said plate 42 swings said rod 30 into releasing position.

A coil spring 54 connecting the latch rod 30 and the latch releasing arm 40 acts, in conjunction with said setscrew 50 and lug 52 to hold the front end 41 of said arm 40 and the size determining plate 42 spaced above the discharge portion 5 a distance slightly greater than the lumps of normal size traveling to said portion 5, but, less than the size of a double so that lumps of dough, of normal size, for instance as shown at 56, may be discharged beneath said plate 42, but, a double, as shown at 57, in dotted lines, is confined on said discharge portion 5 against discharge laterally out of the trough 4 into the conveyor 7 and must pass, under momentum, beyond said discharge portion 5 under the size determining plate 42 so as to raise said plate.

A counterweight 60 may be provided on the latch releasing arm 40 to render raising of said plate 42 by the doubles easier.

An upright, right angled, stop arm 61 is suitably fixed on the rod 22 to limit swinging of the latch rod 30 into releasing position.

A flat knife blade 65 is bolted, as at 66, to the discharge portion 5 transversely thereof to cut the lumps of dough loose from said portion 5 in case the same should adhere to said portion, said blade conforming to the transverse shape of said portion 5.

The operation of my invention will be readily understood. With the deflecting gate 20 latched closed, the lumps of dough 50, of normal, proper size, pass under the size determining plate 42, impinge against the deflecting gate 20 and are deflected by the same and the transverse slant of the discharge portion 5 to discharge out of said portion laterally thereof over the rim 6 onto the conveyor 7 as shown in full and dotted lines in Figure 3. The doubles 57 pass under the size determining plate 42 and raise the same, thereby raising the front end 41 of the latch rod releasing arm 40. This, through the described operating connections between said arm 40 and the latch rod 30, namely the lug 51 and setscrew 52 swings the latch rod 31 into unlatching releasing position to unlatch the deflecting gate 20 so that the doubles may pass, under momentum thereof, under said gate and discharge out of the rounder 1 beyond the conveyor 7 in a path substantially longitudinally of the mold board 3 and trough 4.

A suitable trough 70 may be provided for catching the discharged or ejected doubles 57.

The deflecting plate 20 returns to closed position under the influence of gravity, and the same is true of the latch rod 30 which thereby returns the latch releasing arm 40 and hence the plate 42 to the described normal positions thereof.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a dough ejector, a gate, means pivotally suspending said gate transversely over an upper discharge portion of a spiral mold board of a dough rounder in the path of movement of lumps of dough moving up said mold board, said gate closing under the influence of gravity and opening under the impact of lumps of a given size thereagainst to permit such lumps to pass under said gate, releasable latch means for retaining said gate closed attachable to said rounder, and means for releasing said latch means including a plate adapted to overlie said portion and be moved by passing of the lumps of given size thereunder, and operating connections between said plate and latch means.

2. In a dough ejector according to claim 1, said plate inclining laterally of said portion and to confine the given size lumps on said portion against discharge laterally therefrom.

3. In a dough ejector according to claim 1, said plate being spaced normally above said portion to permit lumps of smaller sizes to discharge laterally under said plate and off said portion.

4. In a dough ejector according to claim 1, said operating connections comprising a pivoted arm carrying said plate and swingable by said plate, and means operatively connecting said arm to said latch means.

5. In a dough ejector according to claim 1, said last means including a pivoted latch rod swingable into releasing position, said operating connections comprising a pivoted arm operatively connected to said rod and carrying and movable by said plate.

References Cited in the file of this patent

UNITED STATES PATENTS

| 1,715,968 | Weber | June 4, 1929 |
| 2,165,495 | Marasso | July 11, 1939 |
| 2,295,246 | Weida | Sept. 8, 1942 |
| 2,399,894 | Schulz | May 7, 1946 |
| 2,611,484 | Sawyer et al. | Sept. 23, 1952 |